US010955921B2

(12) United States Patent
DeBates

(10) Patent No.: US 10,955,921 B2
(45) Date of Patent: Mar. 23, 2021

(54) ELECTRONIC DEVICE WITH OPTICAL USER INPUT MODES AND LOCALIZED HAPTIC RESPONSE, AND CORRESPONDING SYSTEMS AND METHODS

(71) Applicant: Motorola Mobility LLC, Chicago, IL (US)

(72) Inventor: Scott DeBates, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 722 days.

(21) Appl. No.: 15/244,918

(22) Filed: Aug. 23, 2016

(65) Prior Publication Data

US 2018/0059789 A1 Mar. 1, 2018

(51) Int. Cl.
| | | |
|---|---|---|
| *G06F 3/01* | (2006.01) | |
| *G06F 3/042* | (2006.01) | |
| *H04N 5/33* | (2006.01) | |
| *G06F 1/16* | (2006.01) | |

(52) U.S. Cl.
CPC ............ *G06F 3/016* (2013.01); *G06F 1/1616* (2013.01); *G06F 1/1632* (2013.01); *G06F 1/1639* (2013.01); *G06F 1/1675* (2013.01); *G06F 1/1692* (2013.01); *G06F 3/0425* (2013.01); *H04N 5/33* (2013.01)

(58) Field of Classification Search
CPC ........ G06F 3/016; G06F 3/0425; G06F 3/017; G06F 3/0304; G06F 3/0325; H04N 5/33; G03B 21/00; G03B 21/10; G03B 21/14; G03B 21/142; G03B 21/145; G03B 21/008
See application file for complete search history.

(56) References Cited

U.S. PATENT DOCUMENTS

| | | | |
|---|---|---|---|
| 7,690,081 B2 | 4/2010 | Chern | |
| 8,264,599 B2* | 9/2012 | Liu | ...................... H04N 9/3173 348/333.1 |
| 8,356,907 B2 | 1/2013 | Chan et al. | |
| 9,791,975 B2* | 10/2017 | Sharma | ................... G06F 3/042 |
| 2006/0232610 A1 | 10/2006 | Lee et al. | |
| 2006/0234784 A1 | 10/2006 | Reinhorn | |

(Continued)

OTHER PUBLICATIONS

"SMART-CAST Technology and ONE COMPUTING Technology", Current technology description; Provided by Inventor on or before Jul. 5, 2016; Unknown original publication.

*Primary Examiner* — Sardis F Azongha
(74) *Attorney, Agent, or Firm* — Philip H. Burrus, IV

(57) ABSTRACT

An electronic device includes a first housing portion and a second housing portion. A reflective surface defines a major surface of the second housing portion. A signal emitter and a signal receiver are supported by the first housing portion. The signal emitter delivers signals to the reflective surface and the signal receiver receives reflections of the signals to determine one or more of location of an object or whether the object is touching the reflective surface. One or more haptic devices are supported by the second housing portion. One or more processors, operable with the signal receiver and the one or more haptic devices, actuate at least one haptic device when the signal receiver detects the object touching the reflective surface.

20 Claims, 13 Drawing Sheets

(56) References Cited

U.S. PATENT DOCUMENTS

| | | | |
|---|---|---|---|
| 2009/0046035 A1* | 2/2009 | Wen | G06F 1/1615 |
| | | | 345/3.1 |
| 2009/0322967 A1* | 12/2009 | Liou | G06F 1/1616 |
| | | | 348/744 |
| 2010/0103332 A1 | 4/2010 | Li et al. | |
| 2010/0156818 A1* | 6/2010 | Burrough | G06F 3/016 |
| | | | 345/173 |
| 2010/0309442 A1 | 12/2010 | Sadhu | |
| 2012/0052908 A1 | 3/2012 | Kao et al. | |
| 2012/0227006 A1* | 9/2012 | Amm | G06F 1/169 |
| | | | 715/773 |
| 2013/0314380 A1* | 11/2013 | Kuribayashi | G06F 3/0425 |
| | | | 345/175 |
| 2015/0002734 A1 | 1/2015 | Lee | |
| 2016/0316185 A1* | 10/2016 | Weber | H04N 9/3179 |
| 2017/0006267 A1 | 1/2017 | Lim et al. | |

* cited by examiner

ELECTRONIC DEVICE WITH OPTICAL USER INPUT MODES AND LOCALIZED HAPTIC RESPONSE, AND CORRESPONDING SYSTEMS AND METHODS

BACKGROUND

Technical Field

This disclosure relates generally to electronic devices, and more particularly to user interface systems for electronic devices.

Background Art

Electronic devices are continually evolving. So too are their user interface systems. For example, not too long ago the only way to interact with an electronic device was with a keyboard or mouse having with physical keys. More modern electronic devices have now eliminated such keyboards in favor of touch-sensitive displays. Users interact with these touch sensitive displays by touching a flat layer of glass disposed above a capacitive or other sensor spanning the display with a finger or stylus.

For users accustomed to working with a conventional keyboard with physical keys, using more modern systems can be challenging. It is sometimes difficult to know where to place a finger or whether user input has been received. It would be advantageous to have an electronic device with an improved user interface system.

Figure 1:
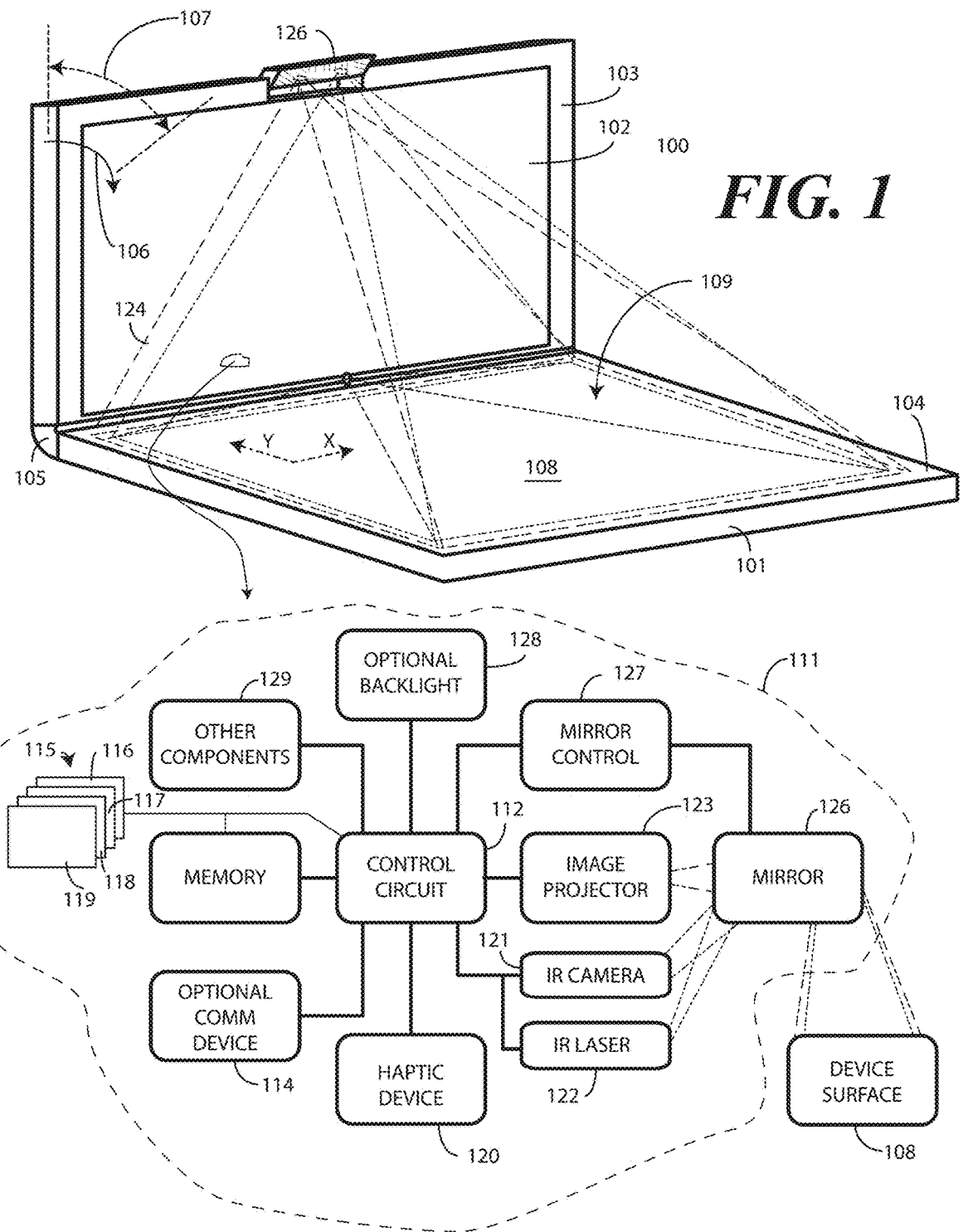
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to electronic devices using innovative user interface systems. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the user interface technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of receiving user input and/or delivering haptic responses to a user as described herein. The non-processor circuits may include, but are not limited to, an optical signal receiver, a optical signal transmitter, signal drivers, clock circuits, power source circuits, and user input devices. As such, these functions may be interpreted as steps of a method to perform the receipt of user input and/or the delivery of haptic responses to a user. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes an adaptable user interface that is projected along a reflective surface. By using a projector to deliver images to the reflective surface, the user interface can take an infinite number of forms due to the fact that it is unconstrained by physical elements such as keys, buttons, or other mechanical user interface devices. The images delivered to the reflective surface can present content to extend the dimensions of the primary display, provide a user interface presentation having one or more user actuation targets with which a user may interact, or simply provide a clean surface that resembles a blank canvas upon which a user may deliver user input.

In one or more embodiments, a signal receiver is configured to receive non-visible signals. In one embodiment, the non-visible signals comprise light and/or radiation with wavelengths in the infrared spectrum. Accordingly, when a user's hand or other warm objects pass along the reflective surface, the signal receiver receives infrared emissions from the hand.

One or more processors, operable with the signal receiver, may use this received non-visible emission as user input to control a cursor, actuate user actuation targets, or perform other control operations. Additionally, gestures and other motions can be detected using the signal receiver. In one embodiment the signal receiver comprises an infrared image capture device. In such embodiments the one or more processors can examine images captured by the image capture device to determine a location (X,Y) of the user's finger or other object. In other embodiments, the signal receiver comprises an infrared photodiode. Other signal receivers will be obvious to those of ordinary skill in the art having the benefit of this disclosure.

In one or more embodiments, a signal emitter is also included. In one embodiment, the signal emitter delivers non-visible signals to the reflective surface. The signal receiver can then receive reflections of these non-visible signals, which the one or more processors then convert to user input. Illustrating by example, in one embodiment the signal emitter is an infrared laser that delivers infrared light of a predefined frequency to the reflective surface. As a user moves their finger or hand along the reflective surface, the signal receiver detects the location (X,Y) of the finger or hand along the reflective surface from the infrared emissions emanating from the finger or hand. However, when the user touches the reflective surface, non-visible light from the infrared laser reflects from the user's finger or hand to the signal receiver, thereby changing its "color" as seen by the signal receiver. In this fashion, the one or more processors can determine not only the X-Y location of the finger or hand along the reflective surface, but also when the finger or hand touches the reflective surface.

In one or more embodiments, the user interface is configured to provide a traditional "legacy" keyboard feel when the user touches the reflective surface. For example, in one or more embodiments the electronic device is configured with one or more haptic devices that deliver tactile feedback similar to that of a conventional keypad or keyboard while maintaining a very slim form factor that is suitable for use with modern, compact, electronic devices. Accordingly, embodiments of the disclosure offer a virtual user interface with which a user can interact, and that can take an infinite number of forms, but that at the same time provides a conventional user interface experience in an interface peripheral that is very thin, simple, and compact.

In one embodiment, an electronic device includes a first housing portion and a second housing portion that are coupled together at a hinge. In one embodiment, the first housing portion and second housing portion join together to resemble a conventional laptop computer. In another embodiment, the first housing portion and the second housing portion join together to form a "folio" appearance, such as where a tablet computer is disposed within a folio. Other appearances of the first housing portion and the second housing portion will be obvious to those of ordinary skill in the art.

In one or more embodiments, the first housing portion comprises a display, such as an organic light emitting diode (OLED) or other conventional display. The second housing portion, rather than including a physical keyboard or second display, instead comprises a reflective surface. In one embodiment, the reflective surface defines a substantially planar major surface of the first housing portion.

In one or more embodiments, the first housing portion supports a signal emitter. In one embodiment, the signal emitter delivers non-visible signals to the reflective surface of the second housing portion. In one embodiment, the non-visible signals comprise infrared light, which may have a predefined frequency. For example, the signal emitter may be an infrared light emitting diode, an infrared laser diode, or an infrared laser, emitting light at 860 nanometers. The signal emitter can transmit a beam of infrared light that reflects from an object touching the reflective surface to the signal receiver. The one or more processors can interpret this reflection as user input, and more particularly, user input where a user's finger or other objection contacts the reflective surface.

In one or more embodiments, the second housing portion supports one or more haptic devices, which are operable with the one or more processors. In one or more embodiments, when the one or more processors detect, from the reflected signals of the signal emitter from an object touching the reflective surface received by the signal receiver, that an object is touching the reflective surface, the one or more processors can actuate at least one haptic device to deliver tactile feedback to the user. The actuation of one or more haptic devices delivers a tactile "click" back to the user. The one or more processors can then again begin monitoring for additional user input.

In one or more embodiments, to allow for different physical configurations of the electronic device, the first housing portion can pivot about the hinge relative to the second housing portion. To ensure that the projected user interface, and the received reflections of infrared light, is directed from the projector to the reflective surface and from the reflective surface to the signal receiver, respectively, a reflector is included. In one embodiment, the reflector is coupled to first housing portion, and is movable relative to the first housing portion between at least a first position and a second position. The movability of the reflector allows the reflector to maintain a line of sight relationship with the reflective surface as the first housing portion pivots about the hinge relative to the second housing portion. This ensures that light from the projector is always directed toward the reflective surface, and that the signal receiver receives infrared emissions or reflections from the reflective surface. An adjuster can be provided to move the reflector. The adjuster can take any of a number of forms, including manual, passive mechanical, and active mechanical, as will be described in more detail below.

Turning now to FIG. 1, illustrated therein is one explanatory electronic device 100 configured in accordance with one or more embodiments of the disclosure. This illustrative electronic device 100 includes a display 102, which may optionally be touch-sensitive. In one embodiment where the display 102 is touch-sensitive, users can deliver user input to the display 102 by delivering touch input from a finger, stylus, or other objects disposed proximately with the display 102. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing portions, namely, a first housing portion 103 and a second housing portion 104. In this illustrative embodiment, the first housing portion 103 is disposed about the periphery of the display 102.

In one embodiment, the second housing portion 104 is coupled to the first housing portion 103 by a hinge 105. Much as is the case in a conventional laptop computer, the hinge 105 allows the first housing portion 103 to pivot 106 about the hinge 105 such that the first housing portion 103 can be radially displaced 107 from the second housing portion 104 by an amount desired by a user for optimal viewing of the display 102. For example, a user lying down may prefer greater radial displacement 107, while a user sitting at a table may prefer less radial displacement 107, and so forth.

In one or more embodiments, the second housing portion 104 includes a reflective surface 108. In one embodiment, the reflective surface 108 defines a major face of the second housing portion. In this illustrative embodiment, the reflective surface 108 defines a substantially planar major surface 109 of the second housing portion 104. However, in other embodiments, the reflective surface 108 can take other configurations. For example, where the electronic device 100 is a bendable electronic device, the reflective surface 108 may be bendable as well into various shapes and contours. Similarly, where the electronic device 100 is spherical or takes other form factors, the reflective surface 108 can take other shapes as well.

In one embodiment, the reflective surface 108 includes a coating 110 that is configured to reflect visible light. In one embodiment, the coating 110 is configured to reflect both visible and non-visible light. For example, in one embodiment the coating 110 is a matte white coating. In another embodiment, the coating 110 is a matte silver coating. In still another embodiment, the coating 110 is a layer of DA-MAT™ material, which is a flexible vinyl fabric manufactured by the Da-Lite Screen Company. In yet another embodiment, the coating 110 is a layer of High Contrast DA-MAT™ material, which is another flexible vinyl fabric manufactured by the Da-Lite Screen Company. In another embodiment, the coating 110 comprises a glass-beaded coating. In another embodiment, the coating 110 comprises a moderate contrast white or off-white coating. In another embodiment, the coating 110 comprises a high-contrast grey coating. Other coatings will be obvious to those of ordinary skill in the art having the benefit of this disclosure.

A block diagram schematic 111 of the electronic device 100 is also shown in FIG. 1. In one embodiment, the electronic device 100 includes one or more processors 112. The one or more processors 112 are operable with the display 102 and other components of the electronic device 100. The one or more processors 112 can include a microprocessor, a group of processing components, one or more ASICs, programmable logic, or other type of processing device. The one or more processors 112 can be operable with the various components of the electronic device 100. The one or more processors 112 can be configured to process and execute executable software code to perform the various functions of the electronic device 100.

A storage device, such as memory 113, can optionally store the executable software code used by the one or more processors 112 during operation. The memory 113 may include either or both static and dynamic memory components, may be used for storing both embedded code and user data. The software code can embody program instructions and methods to operate the various functions of the electronic device 100, and also to execute software or firmware applications and modules. The one or more processors 112 can execute this software or firmware, and/or interact with modules, to provide device functionality.

In this illustrative embodiment, the electronic device 100 also includes an optional communication circuit 114 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 114 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 114 can include wireless communication circuitry, one of a receiver, a transmitter, or transceiver, and one or more antennas.

In one or more embodiments, the electronic device includes one or more haptic devices 120. In one embodiment, the one or more haptic devices 120 are supported by the second housing portion 104 beneath the reflective surface 108. The haptic devices 120 are configured to deliver haptic feedback to the second housing portion 104, the reflective surface 108, or combinations thereof. Haptic feedback refers to tactile sensations that can be sensed by touch by a user. The haptic feedback may optionally be accompanied by acoustic sounds as well. Examples of haptic feedback include vibrations, bumps, thumps, knocks, or other mechanical sensations delivered by the haptic devices 120 to the second housing portion 104 and/or the reflective surface 108.

Figure 7:
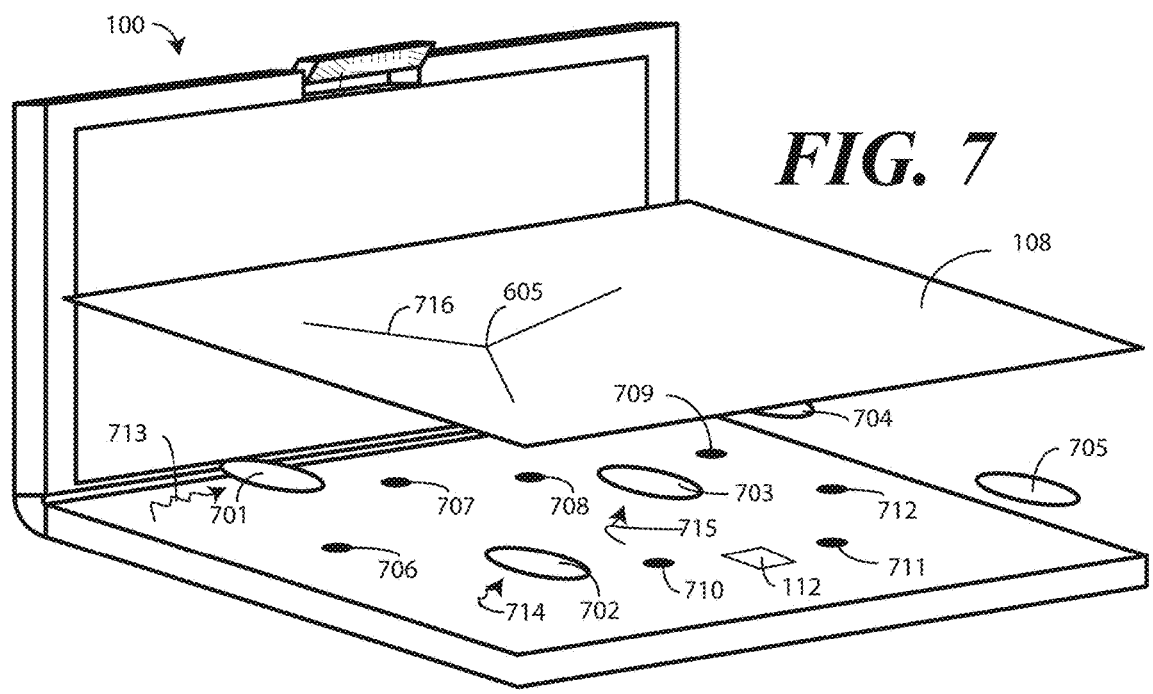
FIG. 7 illustrates an exploded view of one explanatory electronic device in accordance with one or more embodiments of the disclosure.

In one or more embodiments, the one or more haptic devices 120 comprise actuators such as piezoelectric transducers, electromechanical devices, and/or other vibration inducing devices that are mechanically coupled to one or more of the second housing portion 104 and/or the reflective surface 108. The one or more haptic devices 120 may be configured in various arrangements or configurations, and may take various shapes and sizes as well. For example, while the one or more haptic devices 120 shown below with reference to FIG. 7 are shown as discs, they may take other forms, such as strips. The one or more processors 112, which are operable with the one or more haptic devices 120, deliver electronic signals to the one or more haptic devices to actuate the same. The one or more processors 112 actuate at least one haptic device to deliver haptic feedback to one or both of the second housing portion and/or the reflective surface 108.

As will be described in more detail below with reference to FIG. 7, the one or more haptic devices 120 can be configured as a centralized haptic system or a localized haptic system. A centralized haptic system would have a single haptic device that delivers haptic feedback generally to the entire second housing portion 104 and/or reflective surface 108, rather than to an individual section, to provide haptic feedback output to a user. By contrast, other embodiments employ a plurality of haptic devices, which may be arranged in an array or otherwise distributed beneath the reflective surface 108, with each haptic device disposed at a separate location. This allows the one or more processors 112 to selectively actuate haptic devices to provide haptic feedback at localized locations rather than to the entire second housing portion 104 and/or the entire reflective surface 108.

Where configured to provide localized haptic responses, the one or more processors 112 may actuate individual ones of the haptic devices to provide haptic feedback as a function of at least one of a location (X,Y) along the reflective surface 108. As will be described in more detail below, in one embodiment this location corresponds to the location at which a user touches the reflective surface 108 as determined by a signal receiver 121 by receiving reflections from a signal emitter 122. In such embodiments, the one or more processors 112 can identify the location upon the signal receiver 121 receiving reflections of non-visible signals, e.g., infrared light, from the signal emitter 122. The one or more processors 112 then selectively actuate at least one of the haptic devices that corresponds to the identified contact location to generate haptic feedback output for the user. By varying the drive signal delivered to the haptic devices, the one or more processors 112 are also operable to control the magnitude and time duration of the generated haptic feedback output as well.

Figure 3:
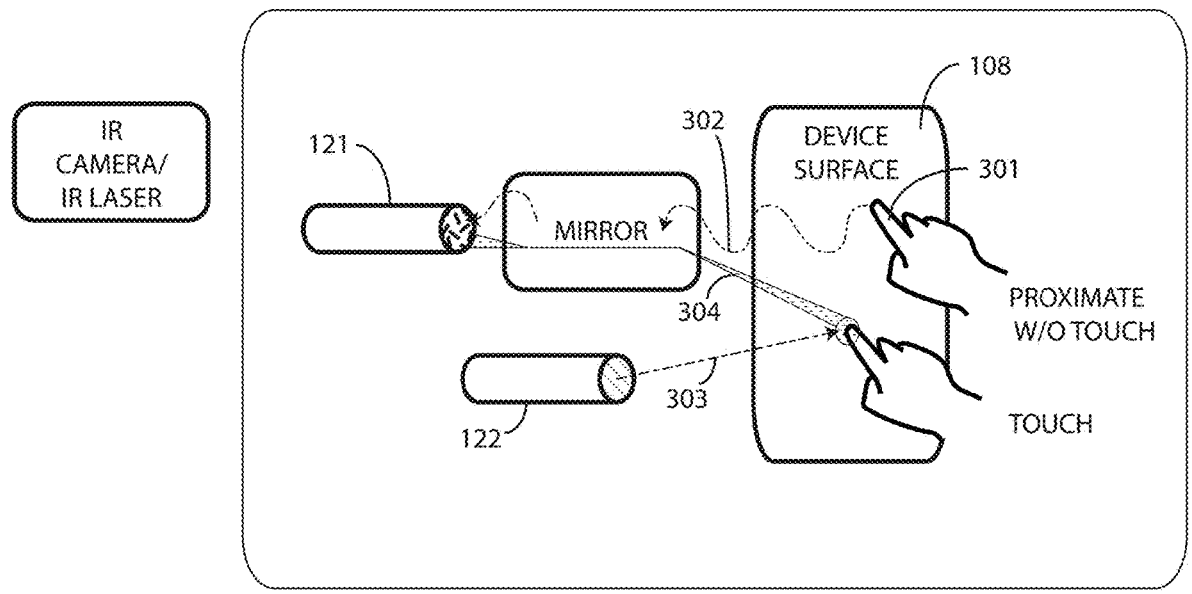
FIG. 3 illustrates one embodiment of a signal emitter and receiver in accordance with one or more embodiments of the disclosure.

Turning briefly to FIG. 3, the signal receiver 121 is configured to detect a finger 301 or other warm object when it is proximately located with the reflective surface 108 by receiving signal emissions 302 from the finger 301 or other warm object. In one embodiment, the signal receiver 121 is configured to receive infrared emissions 302 from a finger 301 or other warm object proximately located with the reflective surface 108.

In one embodiment, the signal receiver 121 comprises an infrared photodiode. In another embodiment, the signal receiver 121 comprises an infrared image capture device such as an infrared camera. Advantageously, using an infrared camera as the signal receiver 121 allows the one or more processors (112) to analyze the location of a user's finger or other warm object across a series of images to determine where the finger or other warm object is located, e.g., location (X/Y). In one embodiment, the signal receiver 121 is configured to receive infrared wavelengths of at least about 860 nanometers. In one embodiment, the signal receiver 121 can operate at various sensitivity levels so as receive the infrared emissions from different distances. In other embodiments, the signal receiver 121 can be designed to have changing detection thresholds controlled by the one or more processors (112).

The signal emitter 122 is configured to deliver non-visible signals 303 to the reflective surface 108. While the signal receiver 121 and the signal emitter 122 can be operable with any number of non-visible signals, including capacitively sensed signals, magnetic signals, inductive signals, photoelectric signals, acoustic/sonic signals, radar-based signals, Doppler-based signals, thermal signals, and radiation-based signals, in one or more embodiments the non-visible signals comprise infrared light. Accordingly, in one embodiment the signal emitter 122 delivers infrared light to the reflective surface 108.

In one embodiment, the signal emitter 122 comprises an infrared diode or infrared laser that is configured to transmit infrared signals having wavelengths of about 860 nanometers, which is one to two orders of magnitude shorter than the wavelengths of radiation emitted by a human finger or hand. Accordingly, the signal receiver 121 can receive signals of a first wavelength, i.e., the infrared emissions 302 emanating from the finger 301 or hand, when detecting location (X,Y) as a user moves their finger 301 or hand along the reflective surface 108. However, when the user touches the reflective surface 108, the shorter wavelength light from the signal emitter 122 reflects 304 from the user's finger or hand to the signal receiver 121, thereby changing its "color" to a warmer tone as seen by the signal receiver 121. In this fashion, the one or more processors can determine not only the X-Y location of the finger 301 or hand along the reflective surface 108, but also when the finger 301 or hand touches the reflective surface 108.

Turning now back to FIG. 1, in one or more embodiments, the one or more processors 112 are operable to actuate at least one haptic device when the signal receiver 121 detects an object, such as a user's finger, stylus, or other object, touching the reflective surface 108 from the reflections of infrared light emitted from the signal emitter 122. When the actuation signal is an impulse, the user feels a "pop" or "click" haptic response, which simulates the feeling of a physical key of a conventional keyboard returning to its steady state position from an actuated position. While the key press simulated response is one type of haptic feedback that can be delivered to the user, embodiments of the disclosure permit other responses to be delivered as well by changing the duration, frequency, or shape of the actuation signal. The one or more haptic devices 120 can further be tuned to emphasize the haptic response, which results in an even more localized and noticeable response to the user. The drive signal can also be tuned such that the reflective surface 108 vibrates at or near a resonant frequency, thereby accentuating the haptic response. By providing haptic feedback, embodiments of the disclosure improve the overall user experience by identifying, physically, when user input is delivered touch to the electronic device 100.

In one or more embodiments, the electronic device 100 also includes a projector 123. In the illustrative embodiment of FIG. 1, the first housing portion 103 supports the projector 123. In one or more embodiments, the projector 123 is configured to deliver images 124 to the reflective surface 108. In one embodiment, the projector 123 is a modulated light projector operable to project modulated light patterns along the reflective surface 108. In another embodiment, the projector 123 is a thin microprojector. In another embodiment, the projector 123 can comprise a laser projector display module. Other types of projectors will be obvious to those of ordinary skill in the art having the benefit of this disclosure.

Figure 2:
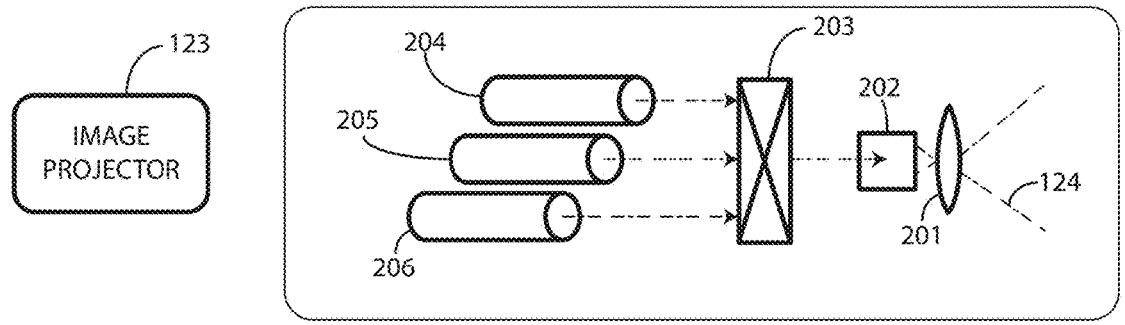
FIG. 2 illustrates one explanatory projector in accordance with one or more embodiments of the disclosure.

Regardless of type, in one or more embodiments the projector 123 facilitates viewing of information and/or interaction with user interface presentations received at the reflective surface 108. Turning briefly to FIG. 2, the projector 123 can include a lens 201 and a spatial light modulator 202 configured to manipulate the light to produce the images 124. The projector 123 can include a light source, such as a single white light emitting diode, multiple separate color light emitting diodes 204,205,206, or multiple separate color laser diodes that deliver visible light to the spatial light modulator through a color combiner 203. A controller (not shown) can be coupled to the spatial light modulator 202 to drive the spatial light modulator 202 to modulate the light to produce the images 124. The spatial light modulator can be optically coupled (e.g., by free space propagation) to the lens 201 and/or a beam steerer. Where used, a beam steerer serves to steer a spatially modulated light beam emanating from the spatial light modulator 202 through the lens 201 to create the images 124.

Turning now back to FIG. 1, as noted above, in one or more embodiments a beam steerer can steer a spatially modulated light beam emanating from the spatial light modulator (202) through the lens (201) to create the images 124. As also noted above, where included, the hinge 105 allows the first housing portion 103 to pivot 106 about the hinge 105 such that the first housing portion 103 can be radially displaced 107 from the second housing portion 104 by an amount desired by a user for optimal viewing of the display 102. In such cases a beam steerer is advantageous to maintain a line of sight relationship 125 with the reflective surface 108.

In this illustrative embodiment, the beam steerer is configured as a reflector 126. In this illustrative embodiment, the reflector 126 is coupled to the first housing portion 103 and is movable relative to the first housing portion 103 between at least a first position and a second position. In one embodiment, the reflector 126 is pivotally movable relative to the first housing portion 103. This ability to pivot allows the reflector 126, when in the second position, to redirect received light to the reflective surface 108 when the first housing portion 103 is radially displaced 107 from the second housing portion 104 about the hinge 105.

In one or more embodiments where a reflector 126 is included, an adjuster 127 is operatively coupled to the reflector 126. The adjuster 127 works to move the reflector 126 when to the first housing portion 103 moves relative to the second housing portion 104. In one or more embodiments, the adjuster 127 is mechanically coupled to the hinge 105 and moves the reflector 126 when the first housing portion 103 moves relative to the second housing portion 104 so as to maintain a line of sight relationship 125 with the reflective surface 108. Details on the operation of the adjuster will be explained below with reference to FIGS. 11-14.

In one or more embodiments, an optional backlight 128 can be disposed beneath the reflective surface 108 to intensify the image 124 delivered to the reflective surface 108. Illustrating by example, in one embodiment the reflective surface could have a coating 110 that is silver or grey, and that is translucent. The backlight 128 can be disposed beneath the reflective surface 108. When the backlight 128 is OFF, the reflective surface would be silver or grey. However, when the backlight 128 is ON, this transitions the appearance of the reflective surface 108 to white. In one embodiment, the backlight 128 is controlled by an automatic light sensor. When lighting conditions justify, the sensor can actuate the backlight 128 to ensure the optimal viewing of the image 124.

The one or more processors 112 can be responsible for performing the primary functions of the electronic device 100. For example, in one embodiment the one or more processors 112 comprise one or more circuits operable with one or more user interface devices, which can include the display 102, to present presentation information to a user. The executable software code used by the one or more processors 112 can be configured as one or more modules 115 that are operable with the one or more processors 112. Such modules 115 can store instructions, control algorithms, and so forth.

In one embodiment, the modules 115 include a projector display manager 116, an infrared input manager 117, an infrared input controller 118, and a haptics manager 119. While these modules 115 are shown as software stored in the memory 113, they can be hardware components or firmware components integrated into the one or more processors 112 as well.

The projector display manager 116 is operable, in one embodiment, to obtain a projection resolution for the projector 123. The projector display manager 116 can then cause the projector 123 to present images 124 along the reflective surface 108.

The infrared input manager 117 can receive the projection resolution and then actuate the signal receiver 121 to receive one or more images of the reflective surface 108 to detect user input. The infrared input manager 117 can then deliver the projection resolution to the haptics manager 119.

When the infrared input manager 117 detects user input, such as a finger or hand being proximately located with, or touching, the reflective surface 108, the infrared input controller 118 can determine a location (X,Y) of the finger or hand along the reflective surface 108. In one or more embodiments, this occurs when the signal receiver 121 captures one or more images of the reflective surface 108. The infrared input controller 118 then determining a location (X,Y) of the hand or other object along the reflective surface 108 from the one or more images as previously described.

When reflections from the single emitter 122 are received by the signal receiver 121, the infrared input controller 118 can determine that the finger or object has touched the reflective surface 108. When this occurs, the infrared input controller 118 can pass the location (X,Y) where the finger or other object to the haptics manager 119. The haptics manager can then actuate at least one haptic device to deliver haptic feedback to the user.

Other components 129 can be included with the electronic device 100. The other components 129 can be operable with the one or more processors 112 and can include input and output components such as power inputs and outputs, audio inputs and outputs, and/or mechanical inputs and outputs. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Now that the various hardware components have been described, attention will be turned to methods, systems, and use cases in accordance with one or more embodiments of the disclosure. As noted above, by using a projector 123 to deliver images 124 to the reflective surface 108, the user interface defined by the images 124 can take an infinite number of forms due to the fact that it is unconstrained by physical elements such as keys, buttons, or other mechanical user interface devices. A few examples of how this can occur are shown in FIGS. 4-6.

Figure 4:
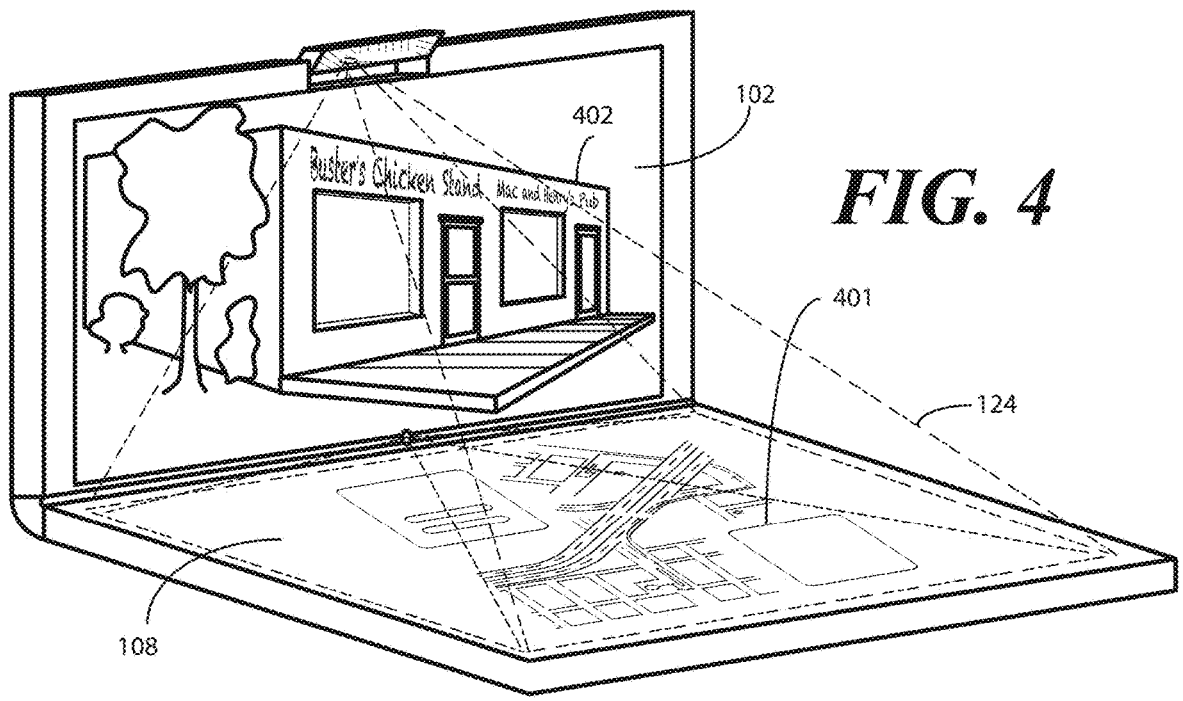
FIG. 4 illustrates one explanatory electronic device in accordance with one or more embodiments of the disclosure in operation.

Beginning with FIG. 4, the images 124 delivered to the reflective surface 108 can present content 401 to extend the dimensions of the primary display 102. In this illustrative embodiment, the user has searched the Internet for information relating to Buster's Chicken Shack, which is located next door to Mac and Henry's Pub. An image 402 of Buster's Chicken Shack is presented on the primary display 102. At the same time, the projector (123) can present an infinite number of images 124 along the reflective surface 108. Here, to extend the dimensions of the primary display 102, the projector (123) presents content 401 comprising a map of directions to Buster's Chicken Shack. Accordingly, embodiments of the disclosure advantageously work to double the size of the display surfaces upon which content 401 can be presented.

Figure 5:
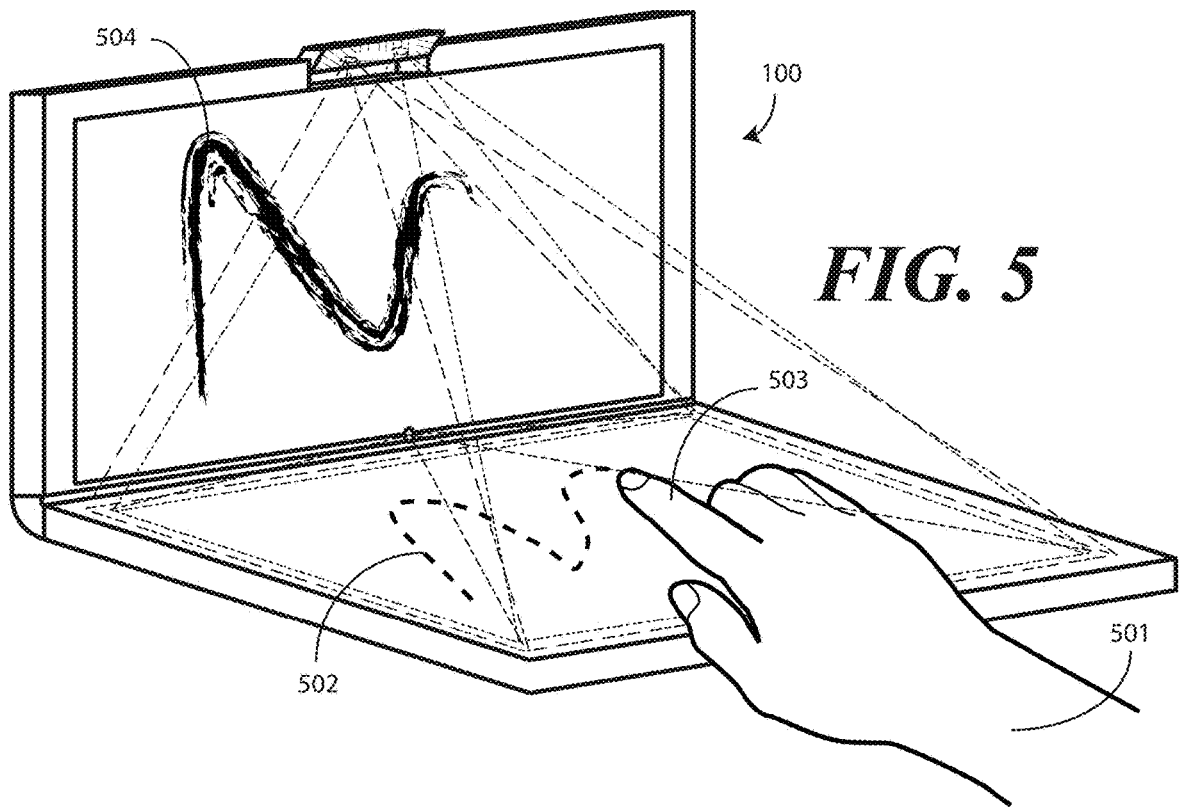
FIG. 5 illustrates a user interacting with one explanatory electronic device in accordance with one or more embodiments of the disclosure.

Turning to FIG. 5, embodiments of the disclosure can also provide a clean surface that resembles a blank canvas upon which a user may deliver user input. As shown in FIG. 5, a user 501 is delivering user input 502 to the electronic device 100 by passing a finger 503 along the reflective surface 108. As previously described, a signal receiver (121), which can comprise an infrared imager, can capture one or more images of the reflective surface 108. The one or more processors (112) and/or the infrared input controller (118) can examine images captured by the signal receiver (121) to determine a location (X,Y) of the user's finger 503. This can determine where the finger 503 is located, e.g., location (X/Y). As shown in FIG. 5, this user input 502 can be used to control a cursor or other control device to create content 504 that is a function of the user input 502.

Figure 6:
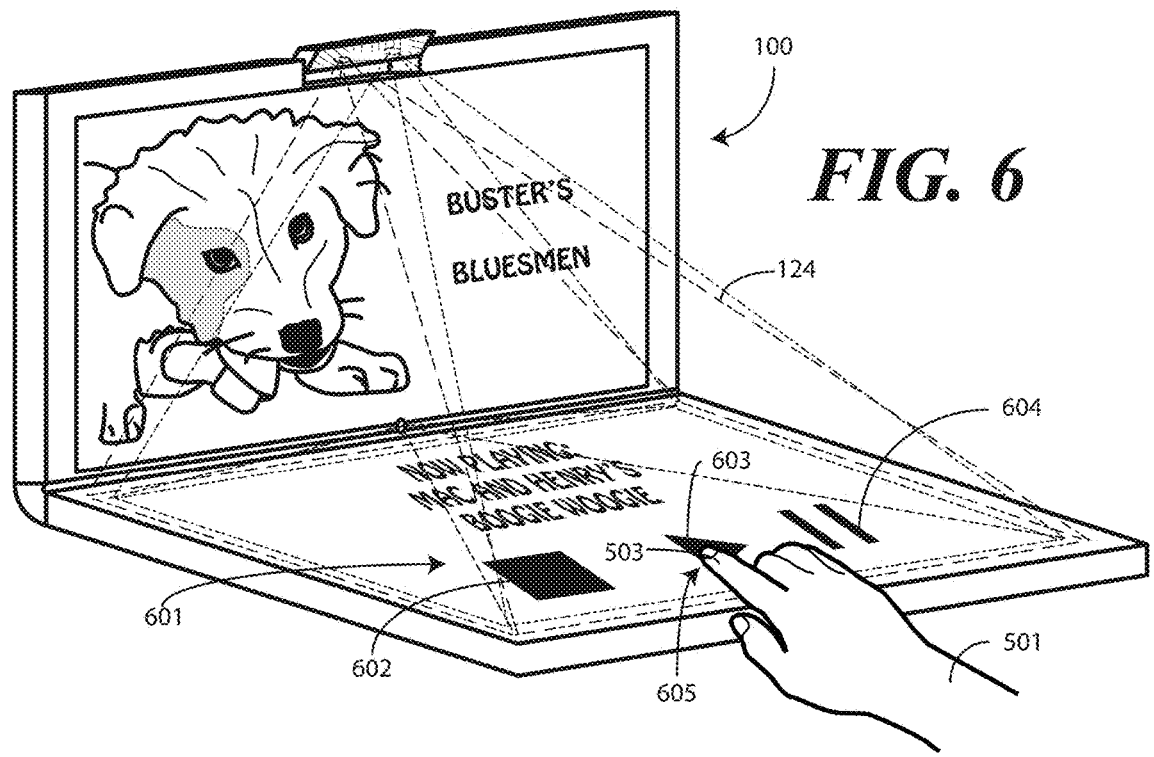
FIG. 6 illustrates a user interacting with one explanatory electronic device in accordance with one or more embodiments of the disclosure.

Turning to FIG. 6, in other embodiments, the use of a projector (123) to present images 124 along the reflective surface 108 can provide a user interface presentation 601 having one or more user actuation targets 602,603,604 with which a user may interact. Here, the electronic device 100 is being used as a music player. Buster's Bluesmen are loaded in the queue with the classic hit, Mac and Henry's Boogie Woogie. The projector (123) delivers images 124 to the reflective surface 108 that define a user interface presentation that includes user actuation targets 602,603,604 that define a stop, play, and pause button, respectively.

The electronic device 100 includes a signal receiver (121) that comprises an infrared imager. The infrared imager captures one or more images of the reflective surface 108. The one or more processors (112) of the electronic device 100 then determine a location 605 of the user's finger 503 along the reflective surface 108 from the one or more images. The one or more processors (112) can then identify whether the location 605 coincides with a user actuation target 603.

The one or more processors (112) can then detect the user 501 touching the reflective surface 108 when the signal receiver (121) receives reflections from a signal emitter (122) off the user's finger 503. Where the finger 503 touches the reflective surface 108 at a location 605 coinciding with a user actuation target 603, which is in this case the play button, the one or more processors (112) can interpret this as user input. Accordingly, the sweet sounds of Buster's Bluesmen playing Mac and Henry's Boogie Woogie begin to play in this example.

Figure 8:
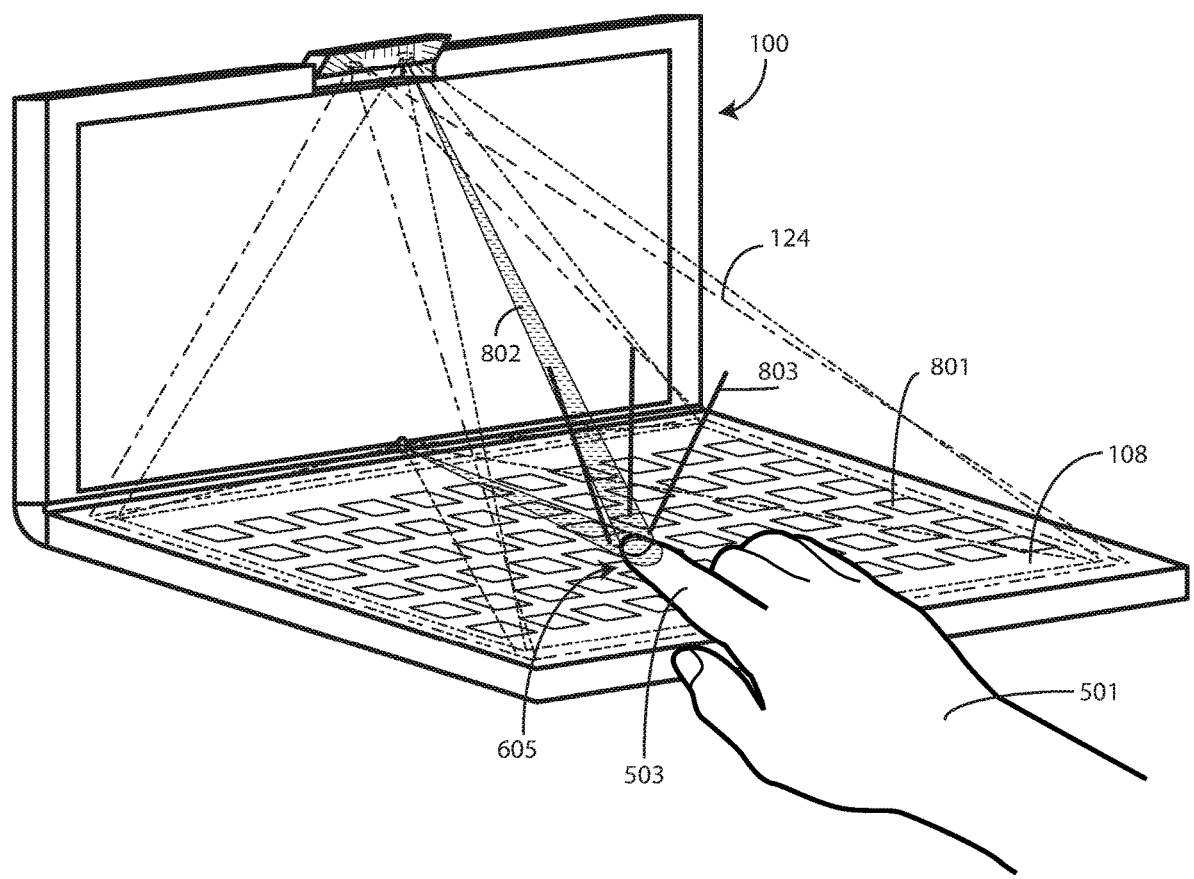
FIG. 8 illustrates a user interacting with one explanatory electronic device in accordance with one or more embodiments of the disclosure.

Turning now to FIGS. 7-8, the concept of providing haptic feedback when the user delivers user input will be described in more detail. Beginning with FIG. 7, the electronic device 100 is shown in a partially exploded view with the reflective surface 108 lifted to reveal both the haptic devices 701,702, 703,704,705 and a plurality of backlights 706,707,708,709, 710,711,712.

As described above, the electronic device 100 can include a single haptic device when configured as a centralized haptic system. However, in FIG. 7, the electronic device 100 includes an array of haptic devices 701,702,703,704,705 to function as a localized haptic system. While five haptic devices 701,702,703,704,705 are shown in FIG. 7 for ease of illustration, the electronic device 100 could have more or fewer haptic devices 701,702,703,704,705.

The inclusion of multiple haptic devices 701,702,703, 704,705 allows the one or more processors 112 to selectively actuate individual haptic devices to provide haptic feedback at localized locations rather than to the entire reflective surface 108.

Illustrating by example, presume that the one or more processors 112 determine the location 605 of a finger or other object touching the reflective surface 108. In one or more embodiments, the one or more processors are operable to actuate at least one haptic device to deliver tactile feedback to the user.

In this example, there are multiple haptic devices 701, 702,703,704,705. Moreover, the location 605 is between haptic devices 701,702,703. In one embodiment, the one or more processors 112 select a subset of the plurality of haptic devices, which in this case constitutes haptic devices 701, 702,703, as a function of the location 605. The one or more processors then apply drive signals 713,714,715 to the haptic devices 701,702,703. In one embodiment, these drive signals 713,714,715 have magnitudes or other signal characteristics that are a function of a distance 716 between the location 605 and the haptic devices 701,702,703, respectively. For instance, the one or more processors 112 may apply a greater drive signal 715 to a haptic device 703 that is farther from the location 605 than to another haptic device 702 that is closer to the location 605.

Turning now to FIG. 8, this process is shown in practice. The projector (123) delivers images 124 to the reflective surface 108 that define a user interface presentation 801 that includes user actuation targets defining a conventional QWERTY keyboard. The signal receiver (121) captures one or more images of the reflective surface 108. The one or more processors (112) of the electronic device 100 then determine a location 605 of the user's finger 503 along the reflective surface 108 from the one or more images. The one or more processors (112) can then identify whether the location 605 coincides with a particular key of the QWERTY keyboard.

The one or more processors (112) can then detect the user 501 touching the reflective surface 108 when the signal receiver (121) receives reflections 802 from a signal emitter (122) off the user's finger 503. Where the finger 503 touches the reflective surface 108 at a location 605 coinciding with a key, the one or more processors (112) can interpret this as user input. In one or more embodiments, the one or more processors 112 actuate at least one haptic device (701,702, 703) to deliver haptic feedback 803 to the user 501. In one embodiment, the one or more processors 112 actuate the at least one haptic device only when the location 605 coincides with a user actuation target.

Figure 9:
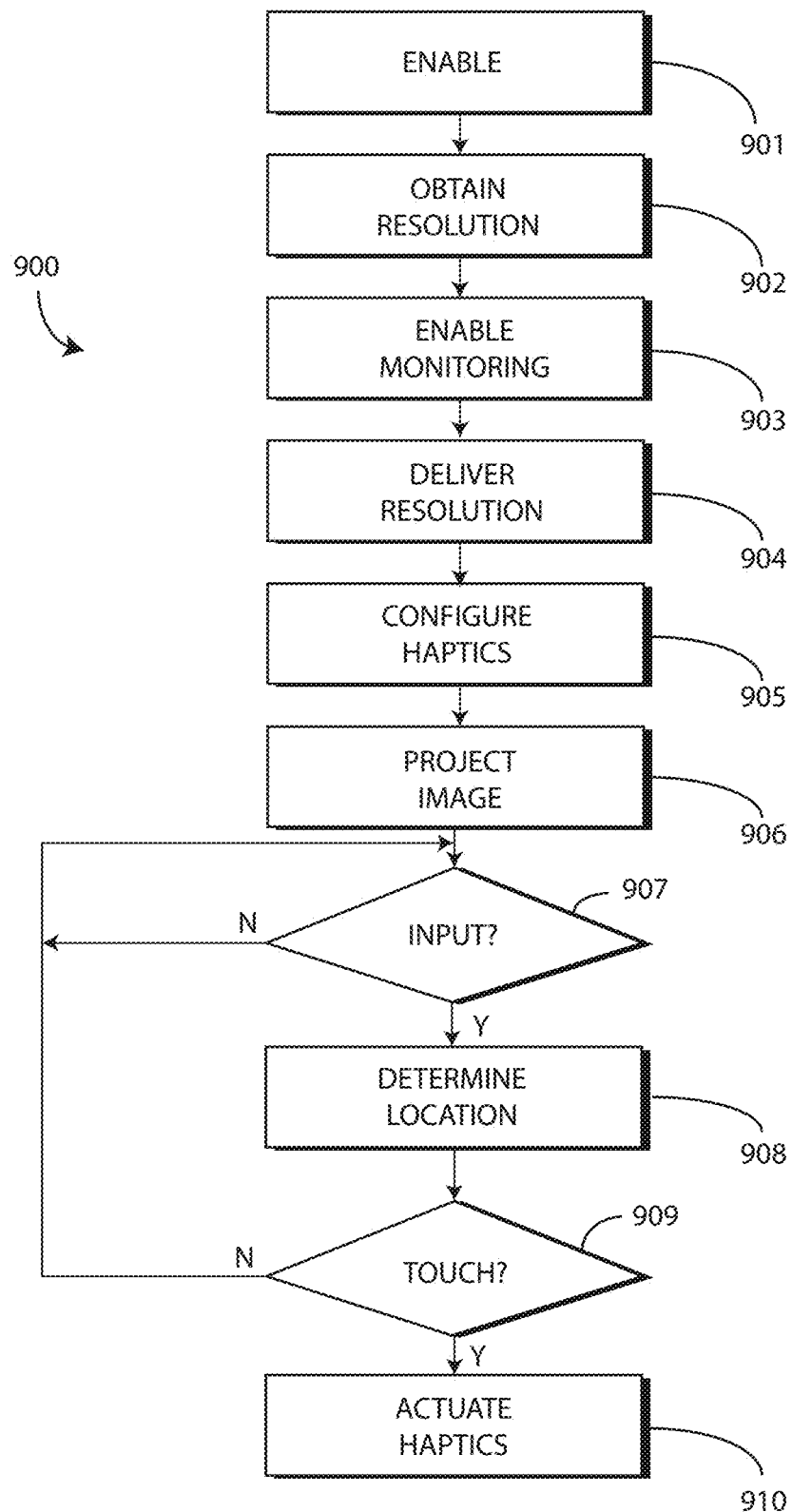
FIG. 9 illustrates one explanatory method in accordance with one or more embodiments of the disclosure.

Turning now to FIG. 9, illustrated therein is one explanatory method 900 for performing the functions described above where the modules of a projector display manager, an infrared input manager, an infrared input controller, and a haptics manager are included. Recall from above that these modules can be hardware components or firmware components integrated into one or more processors.

At step 901, an application, e.g., a web browser, operating on one or more processors of an electronic device initiate a request to use the reflective surface of a second housing portion of the electronic device as either a display or a user interface. At step 902, the projector manager obtains a projection resolution from the projector and sends it to the infrared input manager. In one or more embodiments, the projection resolution can be a function of the application, the projector, or combinations thereof.

At step 903, the infrared input manager enables monitoring of user input. In one embodiment, this occurs by actuating a signal receiver. In one embodiment, the signal receiver is an infrared imager.

At step 904, the infrared input manager passes the projection resolution to the haptics manager. At step 905, the haptics manager configures one or more haptic devices as a function of the resolution. For example, if the resolution is coarse, the haptics manager may configure groups of haptic devices to actuate to deliver haptic feedback within a generalized location. By contrast, when location-determining resolution is fine, the haptics manager may configure individual ones of the haptic devices to actuate when a precise location is known.

At step 906, the projector projects images defining content or a user interface presentation onto the reflective surface of the electronic device. At decision 907, the infrared input manager detects user input. In one embodiment, this occurs when the signal receiver receives infrared emissions from a warm object such as a user's finger.

At step 908, the infrared input controller determines a location of the warm object. In one embodiment, this occurs by analyzing one or more infrared images captured by the signal receiver. At decision 909, the infrared input controller determines whether the warm object touches the reflective surface. In one embodiment, this occurs when the signal receiver receives reflections of infrared light delivered by a signal emitter, and that reflect from the warm object. Where this occurs, at step 910 the haptics manager actuates at least one haptic device.

Figure 10:
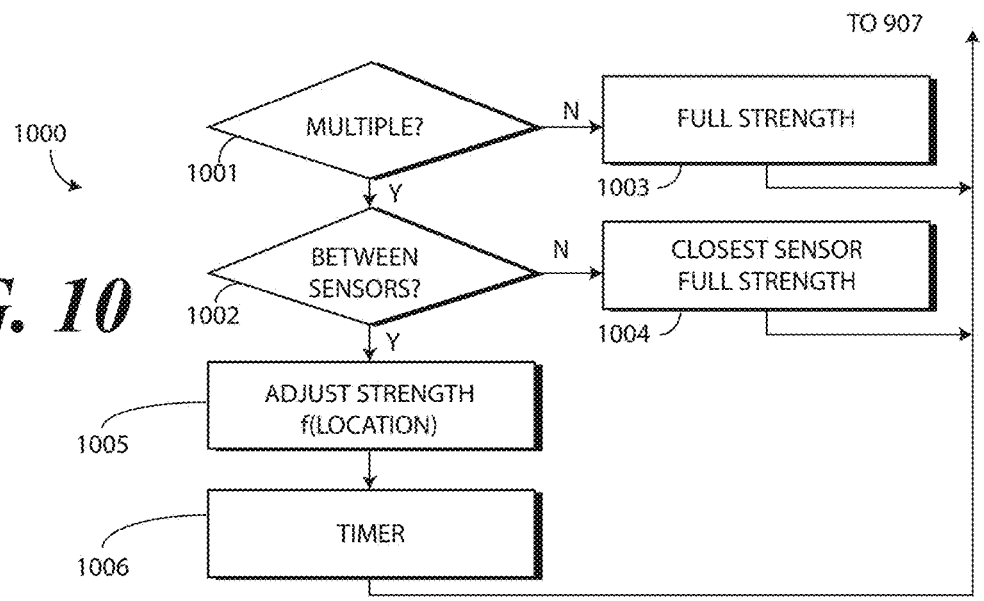
FIG. 10 illustrates another explanatory method in accordance with one or more embodiments of the disclosure.

The way in which haptic devices may be actuated can vary. Turning now to FIG. 10, illustrated therein is one method 1000 for determining how to actuate the haptic devices.

Beginning with decision 1001, the method 1000 determines whether multiple haptic devices are available to be actuated. In one embodiment, this is simply a function of whether multiple haptic devices are included with the electronic device. In other embodiments, this can be a function of resolution, i.e., whether the resolution is fine enough such that individual ones—or groups—of haptic devices can be actuated based upon location. Where it is not possible to enable multiple haptic devices for either reason, at step 1003 the haptics manager is instructed to deliver full strength drive signals to haptic devices to provide tactile feedback.

By contrast, where it is possible to enable multiple haptic devices, the method 1000 moves to decision 1002. At decision 1002, the method 1000 determines whether the location (as determined at step 908 of FIG. 9) is between one or more haptic devices. Where it is not, at step 1004 the haptics manager is instructed to deliver a full strength drive signal to the haptic device closest to the location to provide tactile feedback.

However, in one or more embodiments where the location is between haptic devices, the method 1000 adjusts the strength of the tactile feedback at step 1005 by instructing the haptics manager to deliver varying strength drive signals to the haptic devices surrounding the location. In one embodiment, this occurs as a function of distance in that haptic devices closer to the location receive lower magnitude, frequency, and or duration drive signals than do haptic devices located farther from the determined location. At optional step 1006, the haptics manager can be instructed to enable the haptic devices for actuation for a limited period of time to ensure that only the desired tactile feedback is delivered to a user.

Figure 11:
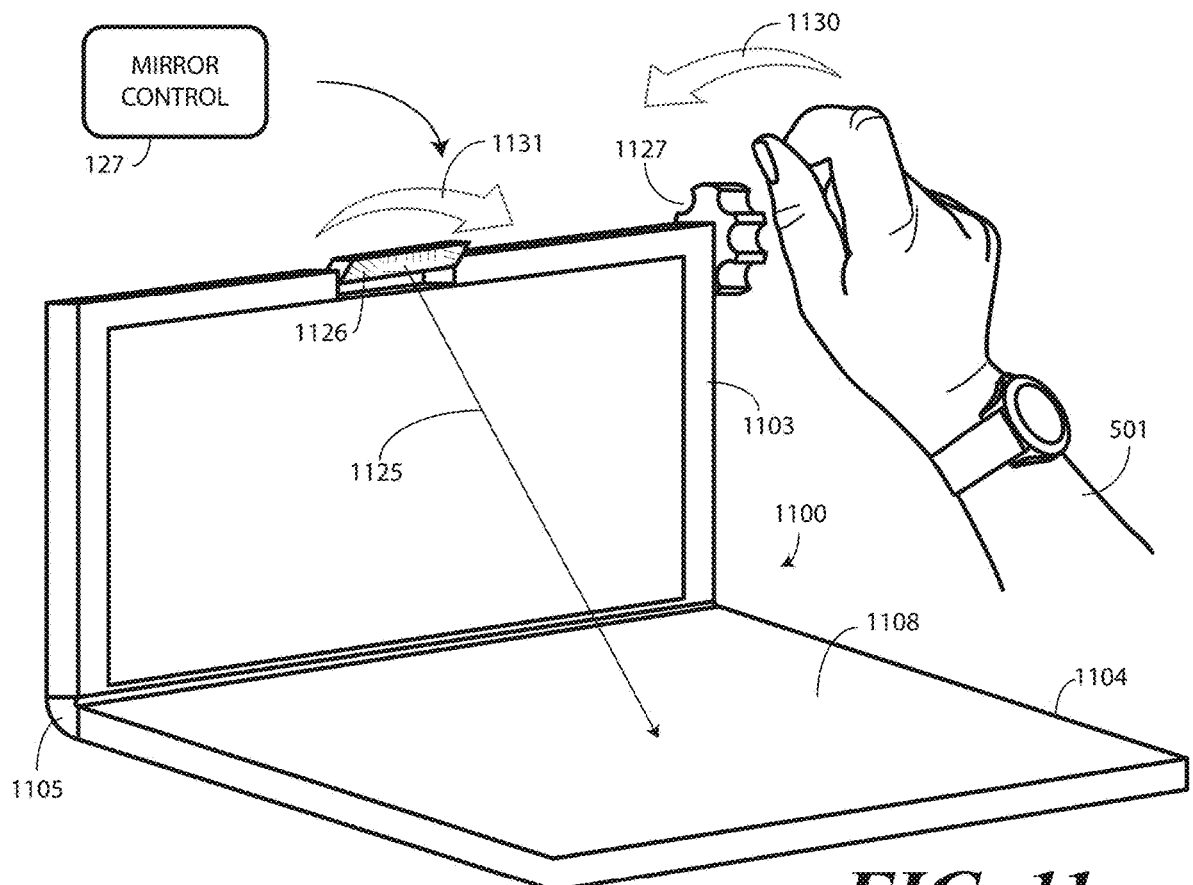
FIG. 11 illustrates one explanatory adjuster for a reflector in accordance with one or more embodiments of the disclosure.
Figure 12:
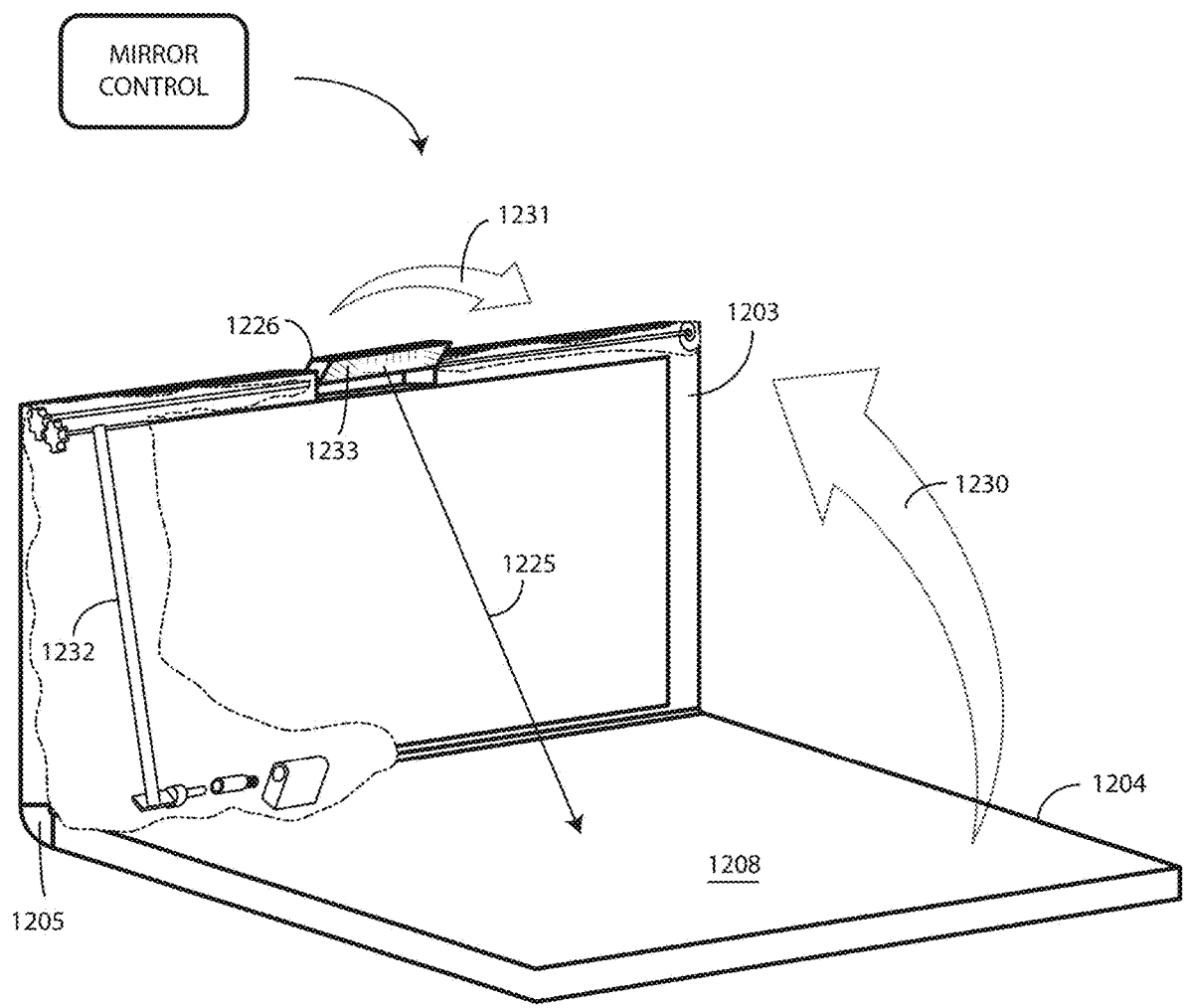
FIG. 12 illustrates another explanatory adjuster for a reflector in accordance with one or more embodiments of the disclosure.
Figure 13:
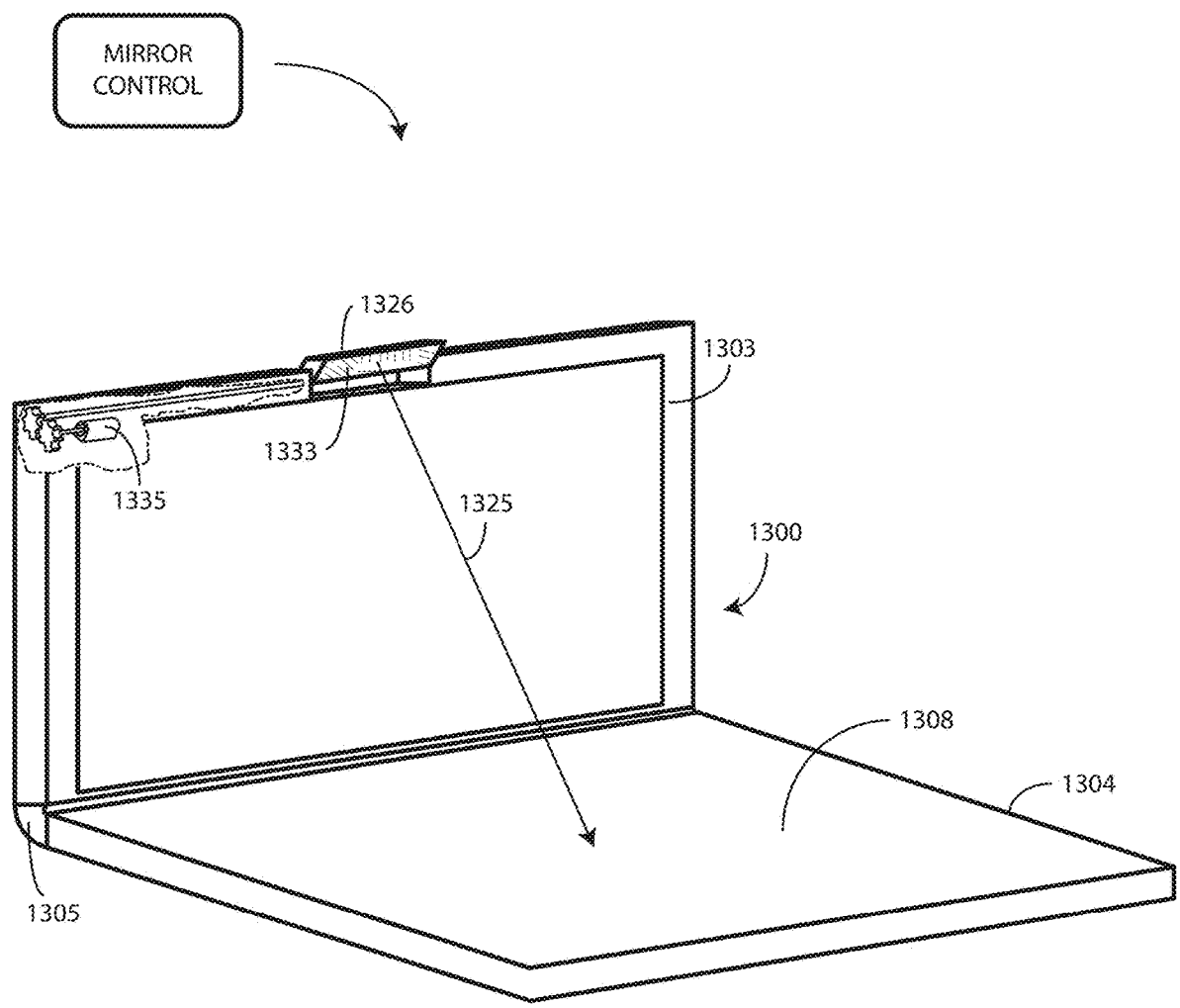
FIG. 13 illustrates yet another explanatory adjuster for a reflector in accordance with one or more embodiments of the disclosure.

Turning now to FIGS. 11-13, illustrated therein are various adjusters operable to move a reflector operable to redirect light from a projector, or to a signal receiver, as a first housing portion moves relative to a second housing portion to ensure that a line of sight relationship is maintained between the projector and the signal receiver, supported by the first housing portion, and the reflective surface defining a major face of the second housing portion.

Beginning with FIG. 11, an electronic device 1100 is shown with a first housing portion 1103 and a second housing portion 1104. A hinge 1105 couples the first housing portion 1103 to the second housing portion 1104. A reflector 1126 is supported by the first housing portion 1103 and is movable relative to the first housing portion 1103 between at least a first position and a second position to maintain a line of sight relationship 1125 with the reflective surface 1108 as the first housing portion 1103 pivots about the hinge 1105 relative to the second housing portion 1104.

An adjuster 1127 is coupled to the reflector 1126. Movement of the adjuster 1127 moves the reflector 1126. In this embodiment, the adjuster 1127 comprises a simple mechanical device that a user 501 can rotate 1130 to pivot 1131 the reflector 1126. While this type of adjuster 1127 requires manual manipulation, it advantageously allows the reflector 1126 to be rotated 180 degrees so as to be capable of projecting images on a wall behind the electronic device 1100 rather than on the reflective surface 1108.

By contrast, turning now to FIG. 12, in this embodiment the reflector 1226 mechanically coupled 1232 to the hinge 1205 by a belt 1234 such that when the first housing portion 1203 pivots 1230 about the hinge 1205 by a radial displacement amount, the reflector 1226 pivots 1232 relative to the first housing portion 1203 in an amount proportional to the radial displacement amount such that a surface 1233 of the reflector 1226 maintains a line of sight relationship 1225 with the reflective surface 1208.

Figure 14:
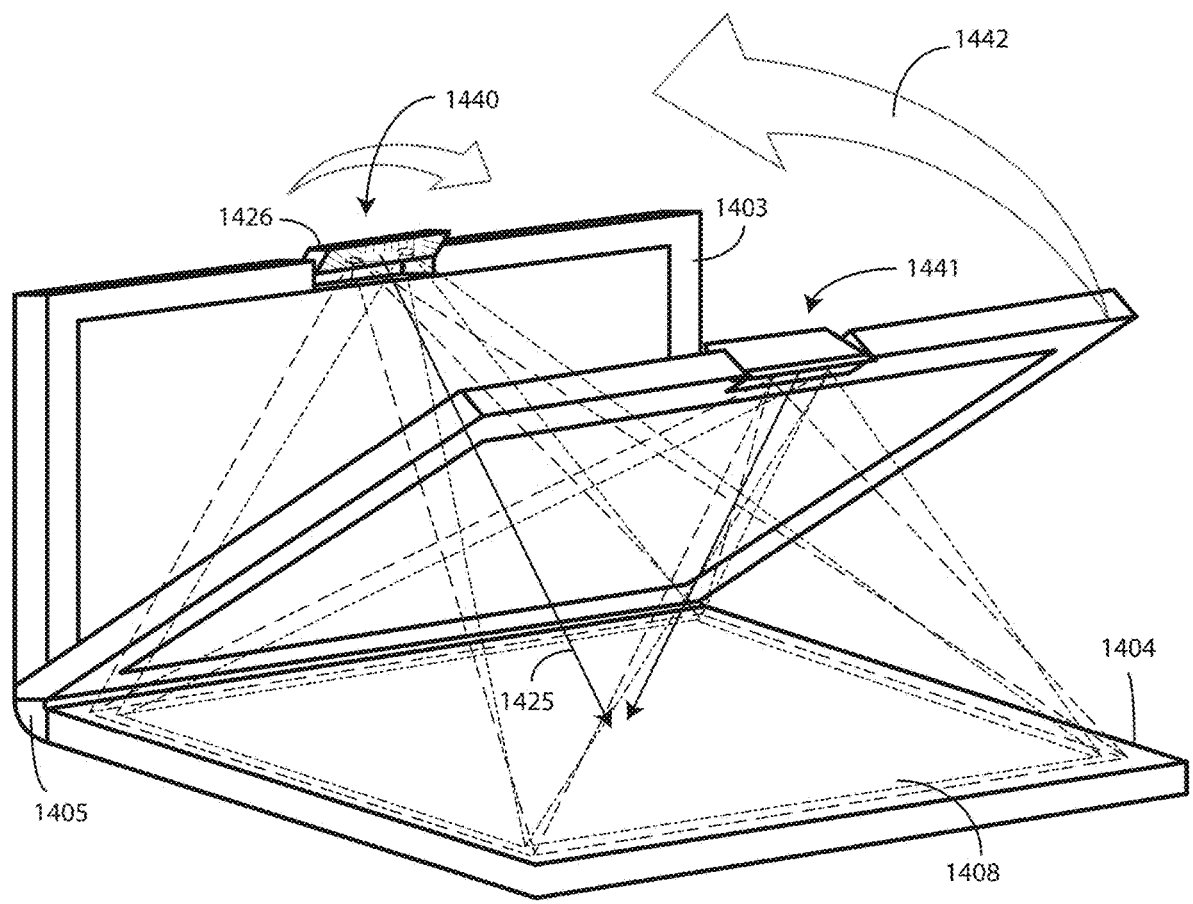
FIG. 14 illustrates one explanatory reflector in operation with an electronic device in accordance with one embodiment of the disclosure.

Turning now to FIG. 13, in this embodiment the electronic device 1300 comprises a motor 1335 coupled to the reflector 1326. The motor 1334 selectively pivots the reflector 1326 such that when the first housing portion 1303 pivots about the hinge 1305 by a radial displacement amount, the reflector 1326 pivots relative to the first housing portion 1303 in an amount proportional to the radial displacement amount such that a surface 1333 of the reflector 1326 maintains a line of sight relationship 1325 with the reflective surface 1308 of the second housing portion 1304. As shown in FIG. 14, when using either the embodiment of FIG. 12 or the embodiment of FIG. 13, the reflector 1426, when coupled to the first housing portion 1403 and movable relative to the first housing portion 1403 between at least a first position 1440 and a second position 1441, redirects received light to the reflective surface 1408 when the first housing portion 1403 is radially displaced from the second housing portion 1404 about the hinge 1405 to maintain a line of sight relationship 1425 with the reflective surface 1408.

To this point, electronic devices described above have been configured as integrated electronic devices, e.g., where the second housing portion, display, first housing portion, projector, signal receiver, and signal emitter are all integrated into a single device. However, in other embodiments, the first housing portion and the second housing portion, with its reflective surface, can be detachable from an electronic device that otherwise includes one or more of a projector, signal receiver, or signal emitter. This allows, for instance, the signal emitter and the signal receiver to be selectively detachable from the first housing portion.

Figure 15:
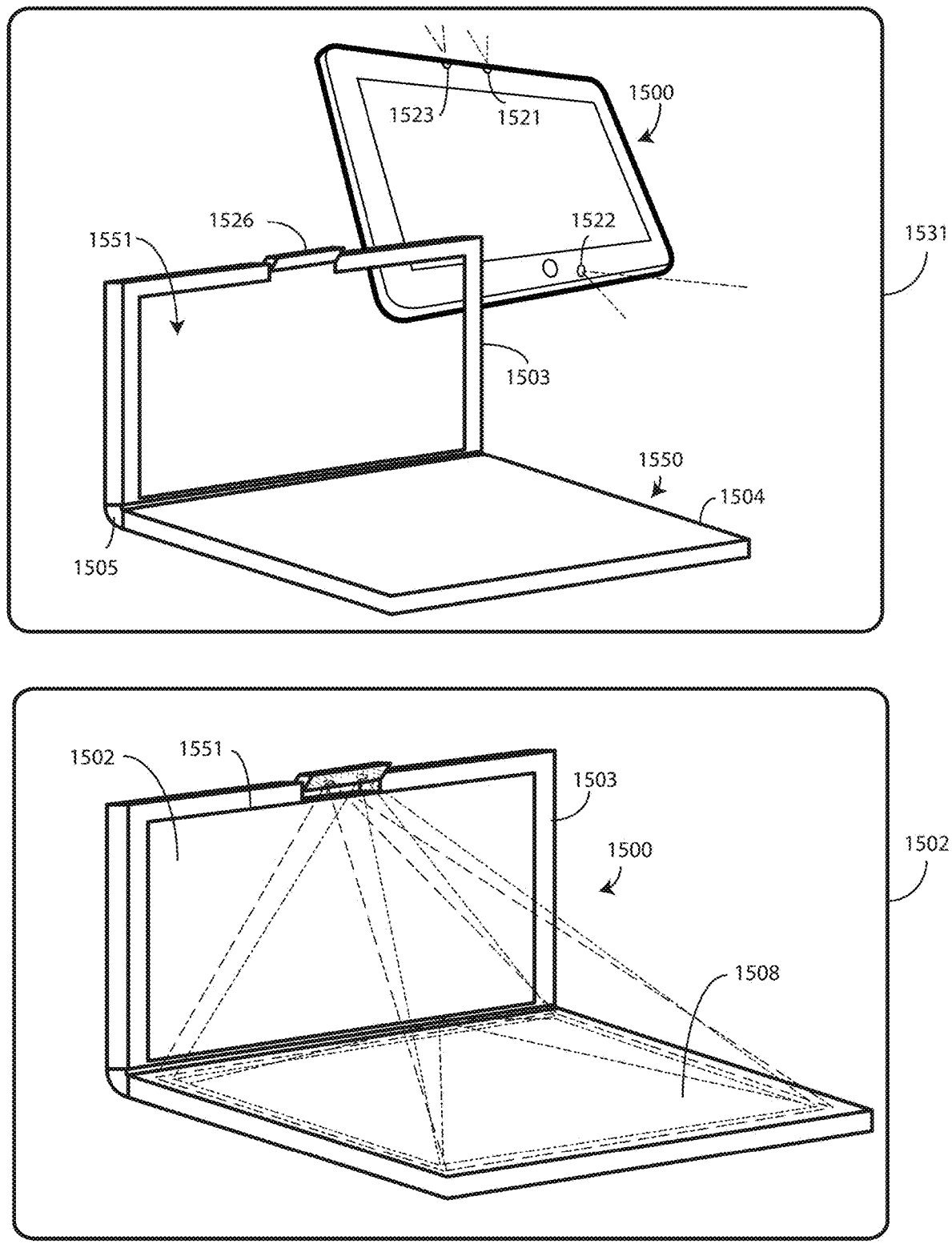
FIG. 15 illustrates another explanatory electronic device in accordance with one or more embodiments of the disclosure.

Illustrating by example, and now turning to FIG. 15, an electronic device 1500 is configured as a tablet computer. A separate folio 1550, includes a first housing portion 1503 and a second housing portion 1504. As before, the second housing portion 1504 includes a reflective surface 1508, which defines a major face of the second housing portion 1504. The first housing portion 1503 includes electrical contacts (not shown) that couple to an electrical connector disposed along the housing of the electronic device 1500. In one or more embodiments, the second housing portion supports one or more haptic devices disposed beneath the reflective surface 1508. Through the electrical contacts and the electrical connector, the one or more processors of the electronic device 1500 can selectively actuate the haptic devices to deliver tactile feedback to a user.

The first housing portion 1503 and the second housing portion 1504 are joined by a hinge 1505. The hinge 1505 allows the first housing portion 1503 to pivot relative to the second housing portion 1504 about the hinge 1505 as previously described. The electronic device 1500 includes a display 1502 and one or more processors to control the display 1502. The electronic device 1500 also includes a signal receiver 1521 and a signal emitter 1522. In this illustrative embodiment, the first housing portion 1503 defines a receiver for the electronic device 1500. Moreover, the first housing portion 1503 defines an aperture 1551 that allows the display 1502 of the electronic device 1500 to be seen when the electronic device 1500 is coupled to the first housing portion 1503.

The first housing portion 1503 also includes a reflector 1526. As before, the reflector 1526 can be movable relative to the first housing portion 1503 between at least a first position and a second position, such that when in the second position, the reflector 1526 can redirect received light to the reflective surface 1508 when the first housing portion 1503 is radially displaced from the second housing portion 1504 about the hinge 1505.

As shown at 1551, the electronic device 1500 is being coupled to the receiver defined by the first housing portion 1503. A portion of the electronic device 1500 can be seen through the aperture 1551. As shown at 1552, the electronic device 1500 is fully coupled to the receiver defined by the first housing portion 1503. The display 1502 of the electronic device 1500 is now visible through the aperture 1551.

The signal emitter 1522 delivers non-visible light to the reflective surface 1508 and the signal receiver 1521 receives reflections of the non-visible light. The projector 1523 delivers images to the reflective surface 1508. In one or more embodiments, the images define a user interface presentation comprising one or more user actuation targets. As previously described, the one or more processors of the electronic device 1500 identify an object touching the reflective surface 1508. For example, when the user touches the reflective surface 1508 at a location that coincides with a user actuation target, the signal receiver 1521 will receive reflections from the signal receiver as reflected off the user. Accordingly, to provide tactile feedback, the one or more processors of the electronic device 1500 can actuate at least one haptic device to provide a click, tap, pop, or other vibration that the user can feel.

Figure 16:
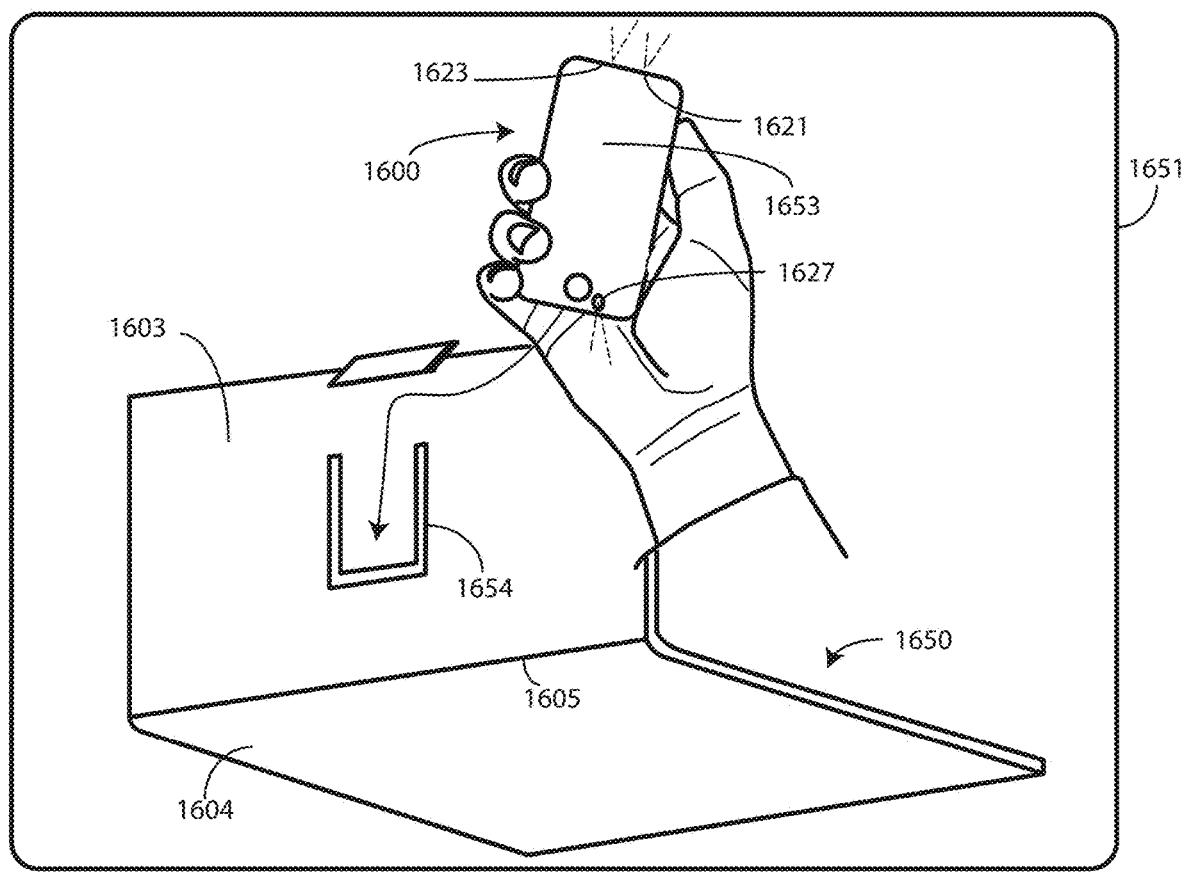
FIG. 16 illustrates another explanatory electronic device in accordance with one or more embodiments of the disclosure.
Figure 16:
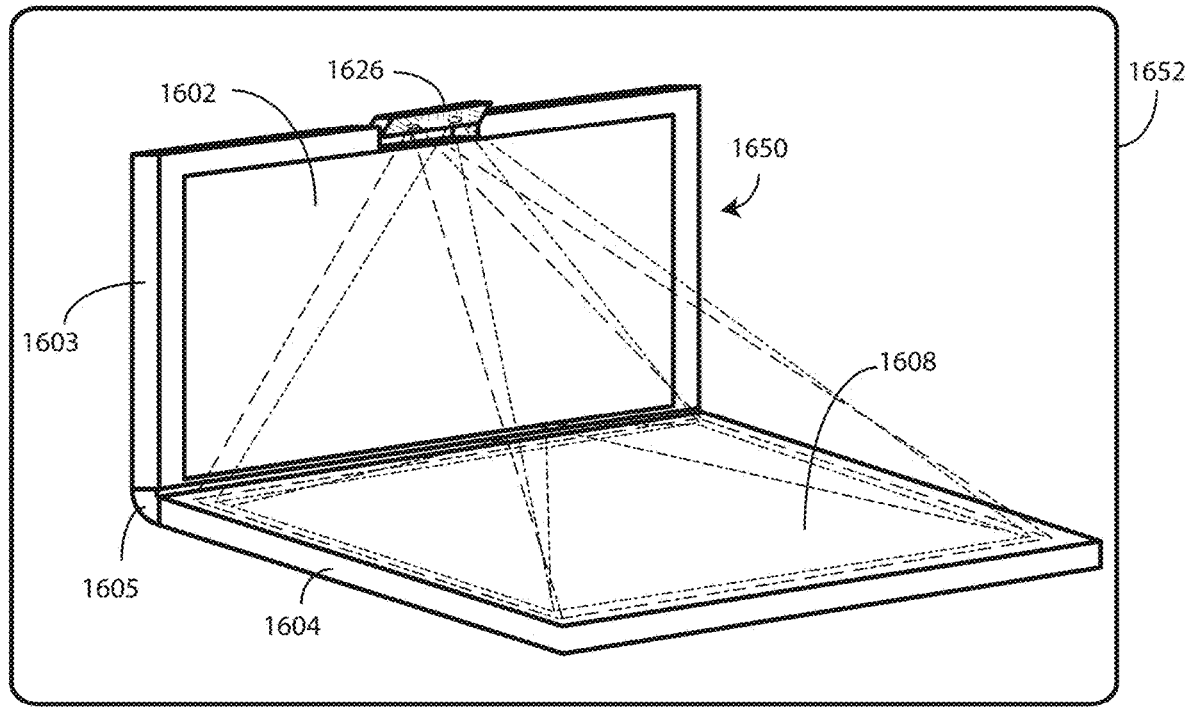

Turning now to FIG. 16, in this embodiment, the electronic device 1600 is configured as a smartphone. A separate folio 1650 includes a receiver 1654 into which the electronic device 1600 may be coupled. Since the display 1653 of the smartphone is relatively small, in this illustrative embodiment the folio 1650 includes its own display 1602, which is larger in size.

The folio 1650 includes a first housing portion 1603 and a second housing portion 1604. As before, the second housing portion 1604 includes a reflective surface 1608, which defines a major face of the second housing portion 1604. The receiver 1654 includes electrical contacts (not shown) that couple to an electrical connector disposed along the housing of the electronic device 1600. In one or more embodiments, the second housing portion supports one or more haptic devices disposed beneath the reflective surface 1608. Through the electrical contacts and the electrical connector, the one or more processors of the electronic device 1600 can selectively actuate the haptic devices to deliver tactile feedback to a user.

The first housing portion 1603 and the second housing portion 1604 are joined by a hinge 1605. The hinge 1605 allows the first housing portion 1603 to pivot relative to the second housing portion 1604 about the hinge 1605 as previously described. The electronic device 1600 includes a display 1602 and one or more processors to control the display 1602. The electronic device 1600 also includes a signal receiver 1621 and a signal emitter 1622.

The first housing portion 1603 also includes a reflector 1626. As before, the reflector 1626 can be movable relative to the first housing portion 1603 between at least a first position and a second position, such that when in the second position, the reflector 1626 can redirect received light to the reflective surface 1608 when the first housing portion 1603 is radially displaced from the second housing portion 1604 about the hinge 1605.

At 1651, a user is inserting the electronic device 1600 into the receiver 1654. At 1652, the electronic device 1600 is fully coupled to the receiver 1654. The display 1653 of the electronic device 1600 can now be mirrored to the display 1602 of the folio 1650 by delivering signals from the electronic device 1600 to electronics disposed in the folio 1650 through the electrical contacts and the electrical connector.

The signal emitter 1622 delivers non-visible light to the reflective surface 1608 and the signal receiver 1621 receives reflections of the non-visible light. The projector 1623 delivers images to the reflective surface 1608. In one or more embodiments, the images define a user interface presentation comprising one or more user actuation targets. As previously described, the one or more processors of the electronic device 1600 identify an object touching the reflective surface 1608. For example, when the user touches the reflective surface 1608 at a location that coincides with a user actuation target, the signal receiver 1621 will receive reflections from the signal receiver as reflected off the user. Accordingly, to provide tactile feedback, the one or more processors of the electronic device 1600 can actuate at least one haptic device to provide a click, tap, pop, or other vibration that the user can feel.

Figure 17:
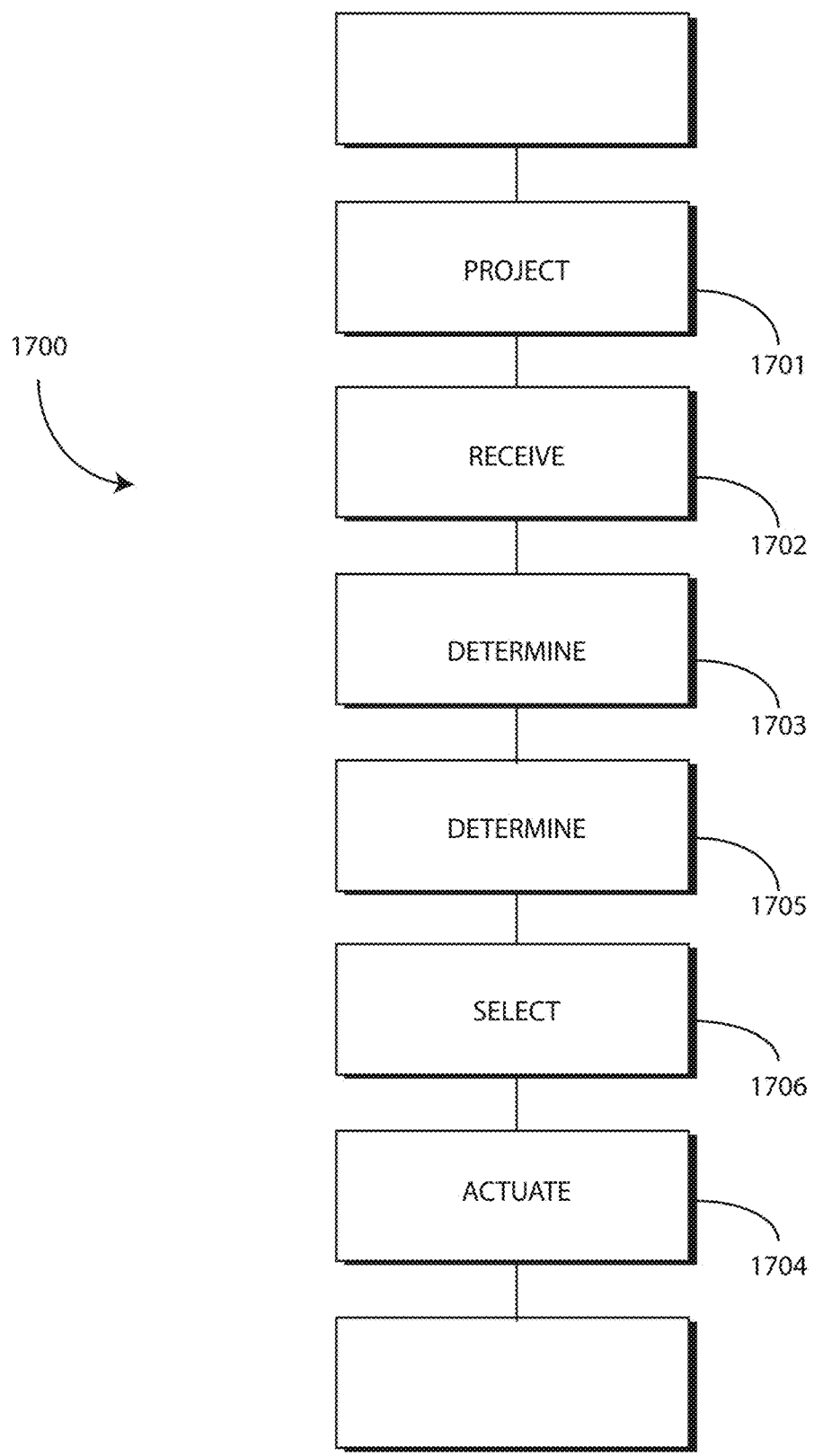
FIG. 17 illustrates yet another method in accordance with one or more embodiments of the disclosure.

Turning now to FIG. 17, illustrated therein is another method 1700 in accordance with one or more embodiments of the disclosure. The method 1700 is suitable for operation on any of the electronic devices described above that include haptic devices, a projector, and a signal receiver.

Beginning with step 1701, the method 1700 projects, with a projector, images defining a user interface along a reflective surface of a device. At step 1702, the method 1700 receives, with a signal receiver, reflections from the reflective surface. In one embodiment, the reflections are reflections of non-visible light. In one embodiment, the non-visible light is infrared light. In one embodiment, the infrared light is delivered to the reflective surface from a signal emitter.

At step 1703, the method 1700 determines, with one or more processors, that an object, such as a user's finger or a stylus, is interacting with the user interface. In one embodiment, step 1703 includes determining that the object is interacting with a user actuation target of the user interface. For example, the user may touch the reflective surface at a location where a user actuation target is being presented by the projector. Where this occurs, at step 1704, the method 1700 includes actuating, with the one or more processors in response to the object interacting with the user interface, at least one haptic device to deliver haptic feedback to the reflective surface.

In one or more embodiments, the method 1700 optionally determines a location of the objection at step 1705. For example, in one embodiment the method 1700 captures, with an imager, one or more images of the reflective surface to determine a location of the object along the reflective surface. Where multiple haptic devices are included in the device, at optional step 1706, the method selects, with one or more processors, one or more haptic devices as a function of the location. For example, step 1706 may include selecting a closest haptic device to the location determined at step 1705. Alternatively, step 1706 may include selecting multiple haptic devices near to, and surrounding, the location. Other techniques for selecting haptic devices will be obvious to those of ordinary skill in the art having the benefit of this disclosure. In some embodiments, step 1705 and step 1706 will be omitted.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A device, comprising:
a first housing portion and a second housing portion;
a reflective surface defining a substantially planar major surface of the second housing portion;
a reflector, coupled to the first housing portion and movable relative to the first housing portion, thereby maintaining a line of sight relationship with the reflective surface as the first housing portion moves relative to the second housing portion;
a signal emitter and a signal receiver, supported by the first housing portion, the signal emitter delivering non-visible signals to the reflective surface and the signal receiver receiving reflections of the non-visible signals;
one or more haptic devices, supported by the second housing portion; and
one or more processors, operable with the signal receiver and the one or more haptic devices and actuating at least one haptic device when the signal receiver detects an object touching the reflective surface from the reflections.

2. The device of claim 1, the signal receiver comprising an infrared imager and capturing one or more images of the reflective surface, the one or more processors determining a location of the object along the reflective surface from the one or more images.

3. The device of claim 2, the one or more haptic devices comprising a plurality of haptic devices, the one or more processors selecting a subset of the plurality of haptic devices as a function of the location of the object.

4. The device of claim 3, the subset comprising at least two haptic devices, the one or more processors applying drive signals to the at least two haptic devices as another function of a distance between the location of the object and the at least two haptic devices.

5. The device of claim 4, the one or more processors applying a greater drive signal to a haptic device that is farther from the location than to another haptic device that is closer to the location.

6. The device of claim 2, further comprising a projector supported by the first housing portion, the projector delivering images to the reflective surface.

7. The device of claim 6, the images defining one or more user actuation targets.

8. The device of claim 7, the one or more processors identifying the object touching the reflective surface as user input when the location coincides with a user actuation target.

9. The device of claim 7, the one or more processors actuating the at least one haptic device only when the location coincides with a user actuation target.

10. The device of claim 6, wherein the signal emitter and the signal receiver are selectively detachable from the first housing portion.

11. The device of claim 1, the non-visible signals comprising infrared signals.

12. The device of claim 1, further comprising:
a hinge coupling the first housing portion to the second housing portion; and
the reflector movable relative to the first housing portion between at least a first position and a second position;
the reflector, when in the second position, redirecting received signals to the reflective surface when the first housing portion is radially displaced from the second housing portion about the hinge.

13. The device of claim 12, further comprising an adjuster coupled to the reflector, wherein movement of the adjuster moves the reflector.

14. The device of claim 13, the reflector operable with the hinge such that when the first housing portion pivots about the hinge by a radial displacement amount, the reflector pivots relative to the first housing portion in an amount proportional to the radial displacement amount such that a surface of the reflector maintains the line of sight relationship with the reflective surface.

15. The device of claim 1, the substantially planar major surface defining a continuous surface.

16. A device, comprising:
a first housing portion and a second housing portion;
a hinge coupling the first housing portion to the second housing portion;
a reflective surface defining a substantially planar major surface of the second housing portion;
a signal emitter and a signal receiver, supported by the first housing portion, the signal emitter delivering infrared light to the reflective surface and the signal receiver receiving reflections of the infrared light;
a projector supported by the first housing portion and delivering images to the reflective surface defining a user interface;
a reflector maintaining a line of sight relationship between the projector and the signal receiver, the reflector supported by the first housing portion and movable relative to the first housing portion between at least a first position and a second position to maintain another line of sight relationship with the reflective surface as the first housing portion pivots about the hinge relative to the second housing portion;
one or more haptic devices, supported by the second housing portion; and
one or more processors, operable with the signal receiver and the one or more haptic devices, the one or more processors actuating at least one haptic device when the signal receiver detects, from the reflections, an object interacting with a user actuation target projected upon the reflective surface.

17. The device of claim 16, the signal receiver comprising an infrared imager, and capturing one or more images of the reflective surface, the one or more processors determining a location of the object along the reflective surface from the one or more images.

18. The device of claim 16, the one or more haptic devices comprising a plurality of haptic devices distributed in the second housing portion the reflective surface.

19. The device of claim 18, the one or more processors selectively actuating an individual haptic device of the plurality of haptic devices when the signal receiver detects, from the reflections, the object interacting with the user actuation target projected upon the reflective surface.

20. The device of claim 18, the one or more processors selectively actuating a subset of the plurality of haptic devices when the signal receiver detects, from the reflections, the object interacting with the user actuation target projected upon the reflective surface.

* * * * *